Figure 1:
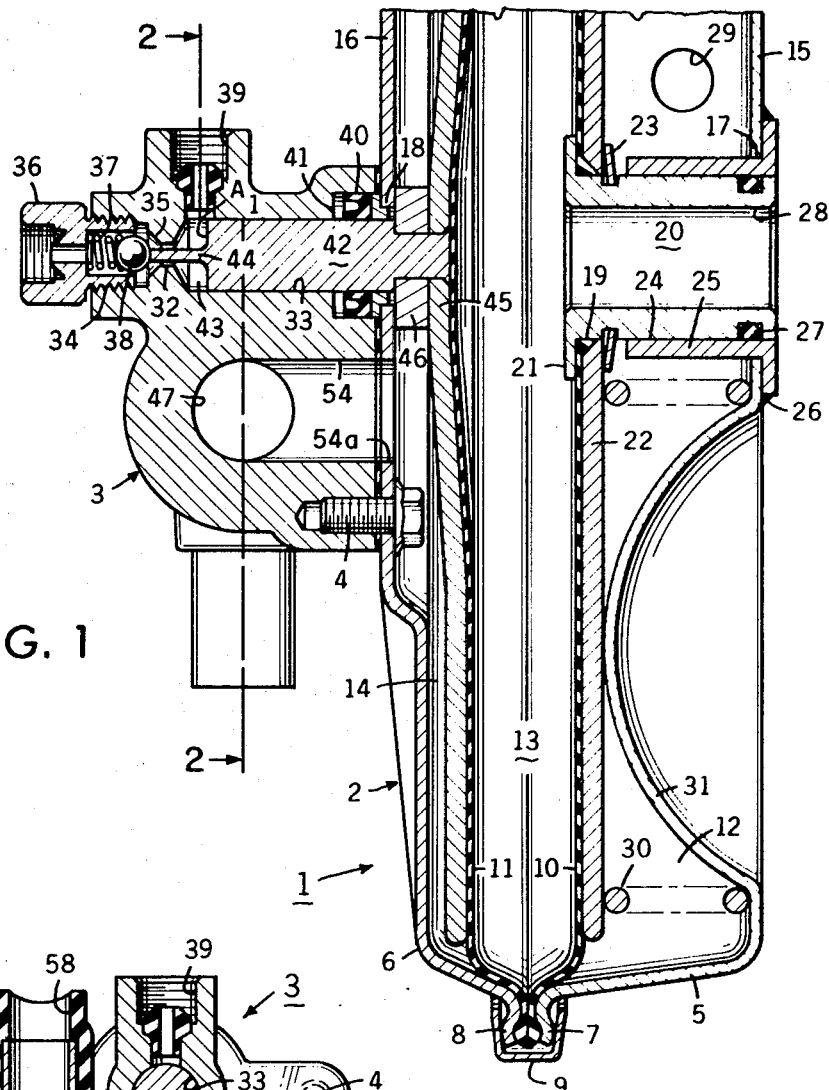

United States Patent

[11] 3,614,171

| [72] | Inventor | John A. Machek |
| | | St. Louis, Mo. |
| [21] | Appl. No. | 66,026 |
| [22] | Filed | Aug. 21, 1970 |
| [23] | | Division of Ser. No. 823,087, |
| | | May 8, 1969, Pat. No. 3,556,466 |
| [45] | Patented | Oct. 19, 1971 |
| [73] | Assignee | Wagner Electric Corporation |
| | | Newark, N.J. |

[54] ANTISKID MECHANISM
11 Claims, 2 Drawing Figs.

[52] U.S. Cl. .................................................. 303/21 AF,
188/181 R, 303/84 A
[51] Int. Cl. ...................................................... B60t 17/18,
B60t 8/02
[50] Field of Search.......................................... 303/21, 24,
61–63, 68–69; 251/61.3, 61, 25; 188/181

[56] References Cited
UNITED STATES PATENTS

| 3,449,019 | 6/1969 | Walker | 303/21 AF UX |
| 3,503,655 | 3/1970 | Heimler | 303/21 F |
| 3,516,715 | 6/1970 | Fielek et al. | 303/21 AF |
| 3,560,056 | 2/1971 | Stelzer | 303/21 F |

Primary Examiner—Milton Buchler
Assistant Examiner—John J. McLaughlin
Attorney—Joseph E. Papin ABSTRACT: An antiskid device is provided with a control valve actuated in response to signals from a sensing mechanism of impending vehicle skid conditions to respectively subject a control member to atmosphere and selectively subject said control member to vacuum for controlling the application of supplied fluid pressure to the vehicle brakes, and a resiliently urged member is provided for disabling said control member in the event the vacuum is lost.

INVENTOR
JOHN A. MACHEK

ANTISKID MECHANISM

This application is a division of copending application Ser. No. 823,087 filed May 8, 1969 now U.S. Pat. No. 3,556,466.

This invention relates in general to brake systems and in particular to antiskid devices for use therein.

In the past, antiskid devices were provided with a control member for controlling the application of supplied fluid pressure to vehicle brakes. The control member was movable from a position establishing open pressure fluid communication between fluid pressure generating means, such as a master cylinder, and a fluid pressure responsive motor, such as a wheel cylinder of a wheel brake, toward an isolating position interrupting pressure fluid communication between said master cylinder and wheel cylinder when the applied fluid pressure acting thereon exceeded a predetermined value. The control member defined an expansible fluid pressure chamber in the antiskid device which was subjected to the applied fluid pressure when said control member was in its isolating position, and said control member was movable to expand said chamber thereby increasing the volume thereof to reduce the magnitude of the applied fluid pressure at the wheel cylinder in response to signals supplied to said antiskid device from a sensing mechanism upon the occurrence of impending vehicle skid conditions. The movement of the control member toward its isolating position and chamber expansion position was opposed by a spring having a rather intense compressive force, and a power piston was provided to selectively control the force of the spring exerted on the control member. In some antiskid devices, the power piston was either vacuum or air suspended wherein the respective introduction of atmospheric air or vacuum on one side thereof established a differential force across said power piston which was utilized to oppose the spring force, and in this manner with the spring force so contained or disabled, the applied fluid pressure acting on said control member was effective to urge said control member toward its isolating and chamber expanding positions. One of the disadvantageous or undesirable features of such past antiskid devices was that the spring which opposed movement of the control member created a delay or response time in the reaction of the control member. In other words, after the antiskid device had received the signal from the sensing mechanism of an impending vehicle skid condition, it was necessary to then establish the differential force by selectively subjecting the power piston to the differential air-vacuum pressure having a magnitude great enough to overcome the force of the spring before the control movement of the control member could be effected. In addition, his undesirable delay, of course, created an undesirable null spot or range in the operating characteristics of the control member.

In addition, the past antiskid devices were provided with a control valve which selectively subjected one side of an atmospheric suspended power piston to the vacuum source to establish the driving force for moving the control member, and the movement of such control valve to selectively subject the power piston to vacuum was effected by a solenoid in response to signals received from a sensing mechanism which ascertained impending vehicle skid conditions. Another disadvantageous or undesirable feature of such past antiskid devices is that the control valves thereof were responsive to the differential fluid pressure of the atmosphere and vacuum acting thereacross to establish forces which opposed or hindered actuation by the solenoid.

The primary object of the present invention is to provide an antiskid device which overcomes the aforementioned disadvantageous or undesirable features, as well as others, and this, along with other advantageous and desirable features of the present invention, will become apparent in the specification which follows.

Briefly, the present invention includes an antiskid device having control means selectively subjected to a differential air-vacuum pressure for controlling the application through said antiskid device of fluid pressure supplied thereto, and other means subjected to a differential air-vacuum pressure for driving said control means toward a position effecting open pressure fluid communication between the supplied and applied fluid pressures in the event the vacuum is lost. Another aspect of the present invention includes a control valve actuated by a solenoid for controlling the selective subjection of the control means to the differential air-vacuum pressure, said control valve having substantially equal and opposed effective areas respectively subjected to the differential air-vacuum pressure.

Figure 2:
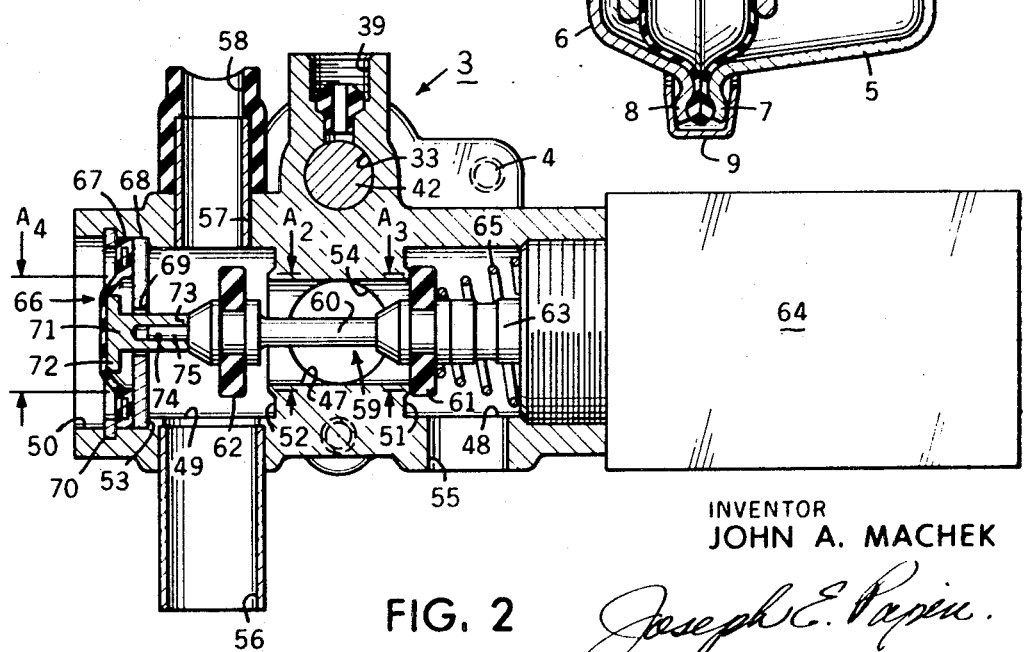

In the drawing, which illustrates an embodiment of the invention and wherein like numerals refer to like parts wherever they occur:

FIG. 1 is a sectional view illustrating a preferred embodiment of the present invention in cross section, and FIG. 2 is a partial sectional view taken along line 2—2 of FIG. 1.

Referring now to the drawings in detail and in particular to FIG. 1, an antiskid device 1 is provided with power and control housings 2, 3 interconnected against displacement by a plurality of studs 4.

The power housing 2 is provided with a pair of opposed, cup-shaped cylinder or housing members 5, 6 having opposed peripheral edges 7, 8 releasably secured against displacement by a conventional clamping band 9, and a pair of split or separate disabling and control diaphragm members 10, 11 are compressed in sealing engagement between said opposed edges dividing said power housing into separate chambers 12, 13 and 14, respectively, which are isolated from each other. The base portions 15, 16 of the housing members 5, 6 are respectively provided with axially aligned apertures 17, 18 therethrough, and the diaphragm 10 is also provided with a centrally located sealing aperture 19 therethrough substantially aligned with said base portion aperture 17.

A venting piston 20 having an annular flange 21 on the leftward or interior end thereof extends through the diaphragm aperture 19, and the diaphragm 10 is positioned in sealing engagement between said piston flange and a diaphragm retainer 22 carried in said piston by suitable means, such as the snap ring and groove assembly 23 provided in the peripheral portion of said piston. The piston 20 extends coaxially through the chamber 12 and is slidably received in a bore 24 axially provided through a hub or extension 25 which extends through the housing member aperture 17 into said chamber, said hub being sealably connected with the housing member base 15 about said aperture by suitable mans, such as a weld 26. The piston 20 is also provided with a peripheral seal 27 in sealing engagement with the hub bore 24, and a bore 28 is axially provided through said piston venting the chamber 13 to the atmosphere at all times.

A port 29 is provided in the housing member 5 in communication with the chamber 12 for connecting said chamber with a vacuum source, as discussed hereinafter, and a plurality of disabling springs 30 are disposed in said chamber having their additive compressive forces Fc contained between the diaphragm retainer plate 22 and the housing member base wall 15, said base wall having a plurality of indentations or scalloped portions 31 defining both seats for positioning engagement with said disabling springs and stops for engagement with said diaphragm retainer plate.

The control housing 3 is provided with a bore 32 interposed between opposed counterbores 33, 34 which are aligned with the aperture 18 provided in the housing member base wall 16, and a shoulder 35 defining a valve seat is provided on said housing at the juncture of the bore 32 and counterbore 34. The counterbore 34 defines an inlet port which is threaded to receive an inlet fitting 36 for connection in pressure fluid communication with fluid pressure generating means, such as a master cylinder (not shown), and a valve spring 37 is biased between said fitting and a check or ball-type valve member 38 urging said valve member toward seating engagement with the valve seat 35. An outlet port 39 which is connected in pressure fluid communication with a fluid pressure responsive motor or wheel cylinder of a vehicle brake (not shown) is also provided in the housing 3 intersecting with the counterbore 33 adjacent to the leftward end thereof, and an annular seal 40 is seated in a recess 41 provided in the rightward end of said counterbore. A control piston or member 42 is slidably received in the counterbore 33 disposed in sealing engagement with the seal 40, and an effective area $A_1$ is provided in the leftward end of said control piston which defines with said counterbore an expansible fluid pressure chamber 43 in open pressure fluid communication with the outlet port 39 at all times. Another extension 44 is integrally formed on the leftward end of the control piston 42 and extends coaxially through the housing bore 32 having a free end in the counterbore 34 normally engaged with the valve 38 to maintain said valve displaced from its housing seat 35. The rightward end of the control piston extends through the aperture 18 in the base wall 16 of the housing 6 into the chamber 14, and a diaphragm retainer plate 45 and stop member 46 are connected with said control piston rightward end for abutting engagement with the diaphragm 11 and the housing base wall 16, respectively.

Referring now also to FIG. 2, the control housing 3 is also provided with a cross-bore 47 interposed between a cross-counterbore 48 and stepped cross-counterbores 49, 50, and shoulders 51, 52 and 53 are provided on said control housing at the juncture of said cross-bore with the cross-counterbores 48, 49, and between the stepped cross-counterbores 49, 50, respectively, said opposed shoulders 51, 52 defining valve seats. Another bore or connecting passage 54 is provided in the control housing 3 having one end intersecting with the cross-bore 47 adjacent to its midportion and the other end thereof connected in open pressure fluid communication with the power housing chamber 14 through another aperture 54a provided in the base wall 16 of the power housing member 6. Atmospheric and vacuum ports 55, 56 for connection with the atmosphere and the vehicle vacuum source are provided in the control housing intersecting with the cross-counterbores 48, 49, respectively, and another vacuum or connecting port 57 is also provided in said control housing intersecting with the cross-counterbore 49, said connecting port 57 and the port 29 in the power housing member 5 being interconnected by a conduit or hose 58 to subject the power housing chamber 12 to the available vacuum at the vacuum port 56 at all times.

A dumbbell-type control valve, indicated generally at 59, is provided with a stem portion 60 which extends coaxially through the cross-bore 47 having spaced opposed valve members 61, 62 thereon in the cross-counterbores 48, 49 for sealing engagement with the valve seats 51, 52, said sealing engagement between said valve members and seats defining effective areas $A_2$, $A_3$, as discussed hereinafter. The rightward end of the valve stem 60 is connected with an armature 63 of an electrical solenoid 64 of a type well known in the art which is threaded into the open end of the cross-counterbore 48, and a return spring 65 of a relatively small compressive force Fs normally urges the control valve 59 toward its normal position engaging the valve member 61 with its valve seat 51 and displacing the valve member 62 from its valve seat 52.

A valve balancing assembly, indicated generally at 66, is provided with a valve diaphragm 67 in abutting engagement with an abutment plate or washer 68 having a centrally located aperture 69 therethrough, and said abutment plate is positioned in engagement with the housing shoulder 53 by a snap ring and groove assembly 70 provided in the leftward end of the cross-counterbore 50 in displacement preventing engagement with the valve diaphragm 67. The working portion of the diaphragm 67 defines an effective area $A_4$ having the exterior side thereof subjected to the atmosphere and the interior side exposed to the available vacuum at the vacuum port 56 through the abutment plate aperture 69, and it should be noted that the effective areas $A_2$, $A_3$ and $A_4$ are substantially equal. A connecting or driving member 71 is movable through the abutment plate aperture 69 having an annular flange 72 on its leftward end engaged with the valve diaphragm 70 and movable toward motion limiting engagement with the abutment plate 68 and an abutment 73 on its rightward end defining a lost motion connection with the valve stem 60 and normally engaged therewith. To complete the description of the device 1, the driving member 71 is provided with an axial guide bore 74 in the rightward or free end thereof in which is slidably received a reduced extension 75 provided on the leftward end of the valve stem 61.

In the operation and assuming, of course, that the vehicle is operative to establish vacuum at the vacuum port 56, the component parts of the antiskid device 1 are in their normal operating positions, as shown in the drawings and as described hereinbefore; therefore, the power housing chamber 12 is evacuated through the power housing member port 29, the hose 58, the control housing connecting port 57 and cross-counterbore 49 to said vacuum port, and the power housing chamber 14 is evacuated through the control housing connecting passage 54, the bore 47, and said cross-counterbore to said vacuum port. Since the power housing chamber 13 is subjected to the atmosphere at all times through the venting piston bore 28, as previously mentioned, the evacuation of the chambers 12, 14 establishes a control differential fluid pressure acting across the diaphragms 10, 11 to create opposed differential forces $F_1$, $F_2$, respectively. The force $F_1$ urges the diaphragm 10 rightwardly in the power housing 2 against the additive compressive forces Fc of the disabling springs 30 toward an inoperative position engaging the diaphragm plate 22 with the indentations 31 of the power housing member 5. The force $F_2$ urges the diaphragm 11 leftwardly in the power housing 2 to engage the stop 46 with the base wall 16 of the power housing member 6 and urges the control piston leftwardly in the counterbore 33 of the control housing 3 to engage the control piston extension 44 with the check valve 38 and maintain said check valve disengaged from its seat 35 thereby establishing open pressure fluid communication between the inlet and outlet ports 34, 39. In this manner, supplied fluid pressure from the master cylinder (not shown) flows from the inlet port and fitting 34, 36 through the control housing bore and chamber 32, 43 to the outlet port 39 being applied therefrom to energize a vehicle brake wheel cylinder (not shown), and the applied fluid pressure at said outlet port acts on the effective area $A_1$ of the control piston 42 to establish a force $F_3$ in opposition to the force $F_2$ acting on the control piston 44.

When the brake wheel cylinder is so energized, the rate of the vehicle velocity is, of course, decreased, and a sensing device (not shown) is utilized to measure decreasing rate of velocity and ascertain the critical rate there of denoting impending vehicle skid conditions, such as in the event the applied fluid pressure is great enough to "lock up" the vehicle brake. When the sensing device ascertains such impending vehicle skid condition, it signals the solenoid 64 which is then electrically energized to move the control valve 59 rightwardly against the compressive force Fs of the return spring 65 toward an operative position engaging the valve member 62 with its valve seat 52 and disengaging the valve member 61 from its valve seat 51. Of course, the engagement of the valve member 62 with the valve seat 52 isolates the power housing chamber 14 from the vacuum port 56, and the disengagement of the valve member 61 from the valve seat 51 effects the flow of atmospheric air from the atmospheric port 55 through the cross-bore and counterbore 47 48 and the connecting passage 54 into the power housing chamber 14 thereby eliminating the control differential fluid pressure acting across the diaphragm 11 as well as the force $F_2$. Upon the elimination of the force $F_2$, the opposing force $F_3$ of the applied fluid pressure at the outlet port 39 acting on the effective area $A_1$ of the control piston 42 moves said control piston and diaphragm 11 rightwardly which expands and increases the volume of the chamber 43; therefore, since the check valve 38 is closed interrupting pressure fluid communication between the inlet and outlet ports 34, 39, the volumetric expansion of the chamber 43 reduces the magnitude of the applied fluid pressure at said outlet port which, of course, serves to reduce the intensity of the vehicle brake actuation and the vehicle deceleration rate thereby obviating the impending vehicle skid condition. This increase in the rate of vehicle velocity is, of course, sensed by the sensing means which ascertains that the danger of a vehicle skid condition is now past, and it again signals the solenoid 64 which is then deenergized. Upon deenergization of the solenoid 64, the compressive force Fs of the valve return spring 65 urges the control valve 59 leftwardly toward its normal position reengaging the valve member 61 with its valve seat 51 and again disengaging the valve member 62 from its valve seat 52 to selectively interrupt pressure fluid communication between the atmospheric port 55 and the power housing chamber 14 and selectively reestablish communication between said power housing 14 and the vacuum port 56. In this manner, the power housing chamber 14 is again evacuated to reestablish the control differential fluid pressure acting across the diaphragm 11 and the force $F_2$, and the reestablished force $F_2$ overcomes the opposing force $F_3$ to move the control piston 44 leftwardly toward its original position thereby reducing the volume of the chamber 43 and reestablishing the magnitude of the applied fluid pressure at the outlet port 39. When the magnitude of the applied fluid pressure at the outlet port 39 is so reestablished, the intensity of the brake energization is increased and the vehicle velocity rate decreased to again cause the sensing device to signal for the energization of the solenoid 64.

From the foregoing, it is obvious that the operating cycle of the antiskid device 1 is repetitive to continually alleviate impending vehicle skid conditions until the master cylinder is deactuated to eliminate the supplied fluid pressure at the inlet port 34 wherein the applied fluid pressure at the outlet port 39 acts on the effective area of the check valve 38 to displace it from its seat 35 against the valve spring 37 establishing a return flow of applied fluid pressure to reduce the magnitude thereof which also reduces the magnitude of the force $F_3$. Upon the reduction of the force $F_3$, the force $F_2$ will return the diaphragm 10 and control piston 42 leftwardly toward its communicating position urging the check valve 38 against its spring 37 and from its seat 35 to reestablish open pressure fluid communication between the inlet and outlet ports 34, 39 for the return flow of displaced fluid pressure.

In the event of the loss of the vehicle vacuum source wherein the vacuum normally available at the vacuum port 56 is replaced by atmospheric pressure, such atmosphere flows through said vacuum port 56, the control housing cross-bore and cross-counterbore 47, 49 and the connecting passage 54 into the power housing chamber 14 eliminating the control differential fluid pressure acting across the diaphragm 10 and the force $F_2$. The atmosphere also flows from the control housing cross-counterbore 49 through the connecting port 57, the hose 58 and the power housing port 29 into the chamber 12 eliminating the control differential fluid pressure acting across the diaphragm 10 and the disabling force $F_1$. Upon the elimination of the force $F_1$, the compressive forces Fc of the disabling springs 30 urge the diaphragm 10 and plate 22 leftwardly into driving engagement with the diaphragm 11 to concertedly drive said diaphragm 11 and control piston 42 toward their original or communicating positions maintaining the check valve 38 displaced from its seat 35 and establishing open pressure fluid communication between the inlet and outlet ports 34, 39. From the foregoing, it is obvious that upon the loss of vehicle vacuum, the disabling springs 30 are effective to drivingly engage the diaphragms 10, 11 and disable the control piston 42 in order to provide open pressure fluid communication between the inlet and outlet ports 34, 39 for the application of the supplied fluid pressure therethrough to actuate the vehicle brakes without the aforementioned regulating or altering effect of the control diaphragm and position 11, 42 on the applied fluid pressure in response to impending skid conditions of the vehicle.

Referring now in detail to the operation of the control valve 59, with the control differential fluid pressure of the atmosphere and vacuum at the ports acting across the valve member 61 on the area $A_3$, a force $F_4$ is created additive to the compressive force Fs of the return spring 65 urging the control valve 59 toward its normal position, as shown in FIG. 2, and urging the valve member 61 toward engagement with its seat 51. The vacuum at the port 56 and the atmosphere also acts across the valve diaphragm 67 on the area $A_4$ thereof to create another force $F_5$ in opposition to the force $F_4$ urging said valve diaphragm 67 and the driving member 71 rightwardly toward engagement with the control valve 59. Since the areas $A_3$, $A_4$ are substantially equal and the differential fluid pressures acting thereacross are also substantially equal, the forces $F_4$, $F_5$ are self-cancelling when the valve member 59 is in its normal operating position; therefore, when the solenoid 64 is actuated, it is initially opposed only by the relatively small compressive force of the return spring 65. The magnetic or operating characteristics of solenoids, such as the solenoid 64, require an extremely high exciting current to energized the armature 63 and effect the initial actuation thereof, as compared for instance with the current necessary to maintain said armature in its energized position in magnetic holding engagement with the pole piece (not shown) of said solenoid. In other words, once the armature 63 is magnetically urged toward or engaged with the solenoid pole piece, the current necessary to maintain said magnetic holding engagement is appreciably less than that needed to excite or initiate the movement of said armature toward said pole piece, and this characteristic is, in the most part, due to the air gap between said armature and pole piece. Therefore, since the exciting current is extremely high, it is desirable to balance the forces $F_4$, $F_5$ acting on the control valve 59 so that the exciting current acting on the armature 63 to effect the initial actuation thereof is opposed only by the rather small force of the return spring 65. Of course, with the forces $F_4$, $F_5$ so balanced, it is apparent that smaller electrical coils (not shown can be employed in the solenoid 64 to actuate the armature 63 and the control valve 59 since the forces opposing the solenoid exciting current are predeterminately minimized.

When the solenoid 64 receives its energization signal from the sensing device, as discussed hereinbefore, the armature 63 is moved rightwardly toward magnetic holding enegagement with its pole piece against only the force Fs of the return spring 65 and is accompanied by the rightward movement of the control valve 59 toward its operating position to disengage the valve member 61 from its seat 51 and move the valve member 62 into engagement with its seat 52. With the control valve 59 in its operating position, the control housing bore and connecting passage 47, 54 are isolated from the vacuum port 56 and communicated with the atmospheric port 55, as previously discussed. As previously mentioned, the stroke of the valve member 62 from its normal position disengaged from its seat 52 toward its operating position engaged with its seat is greater than the stroke of the driving piston flange 72 into engagement with the stop plate 68; therefore, during the initial movement of the control valve 59 toward its operating position, the driving member 71 is drivingly engaged with said control valve with the force $F_5$ acting thereon, but when the driving piston flange 72 is moved into abutment with said stop plate the force $F_5$ is transferred to the control housing 3. As previously noted, once the armature 63 is excited and moving toward its pole piece, the current necessary to maintain such movement toward magnetic holding engagement with said pole piece is relatively small as compared with the exciting current; therefore, the force $F_5$ is initially utilized to assist the movement of the control valve 59 toward its operative position in response to the energization of the solenoid armature 63.

When the control valve 59 is in its operative position and disengaged from the driving piston 71, the force $F_5$ is contained by the housing 3, and the valve member 61 is disengaged from its seat 51 subjecting the area $A_2$ to the atmosphere thereby eliminating the force $F_4$. Since the valve member 62 is engaged with its seat 52 in the operative position of the control valve 59, the control differential fluid pressures of the atmosphere and vacuum at the ports 55, 56 acting across said valve member on the area $A_2$ establishes another force $F_6$ additive to the force $F_s$ of the return spring 65 and urging said control valve leftwardly toward its original position against the magnetic holding force or attraction between the armature 63 and the pole piece of the solenoid 64. When the solenoid 64 receives its deenergization signal from the sensing means, as previously mentioned, the holding force between the armature 63 and the pole piece of said solenoid is eliminated, and the force $F_s$ of the return spring 65 assisted by the force $F_6$ initiates the return leftward movement of the control valve 59 toward its original position. The initial return movement of the control valve 59 disengages the valve member 62 from its seat 52 and thereafter engages the driving piston 71 having the opposing or rightwardly directed force $F_4$ thereon; however, at this time, both valve members 61, 62 are unseated to that momentarily the cross-counterbore 49 is subjected to a pressure approaching atmosphere. In this manner, the force $F_4$ is substantially eliminated when the pressure in the cross-counterbore 49 approaches atmosphere, and the return spring force $F_s$ is then unopposed to thereafter concertedly drive the control valve 59 and driving piston 71 leftwardly toward their normal positions. Once the valve member 61 is reengaged with its seat 51 in the normal position of the control valve 59, the cross-counterbore 49 is again isolated from the atmosphere and subjected only to the vacuum at the port 56; therefore, the force $F_4$ is reestablished along with the opposing force $F_5$.

From the foregoing, it is now apparent that a novel antiskid device 1 meeting the objects and advantageous features set forth hereinbefore, as well as others, is provided and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. An antiskid device comprising a housing, a pair of diaphragm means movable in said housing and defining therewith three separate chambers, one of said chambers being between said diaphragm means and intermediate the other two chambers and subjected at all times to the atmosphere, one of said two chambers being subjected to vacuum, resilient means in said one of said two chambers for urging one of said diaphragm means toward driving engagement with the other of said diaphragm means, said one diaphragm means being moveable toward a disabled position in said housing against the force of the resilient means in said one chamber and the vacuum in said one of said two chambers acting thereon, a pair of ports in said housing, other means movable in said housing for controlling pressure fluid communication between said ports and drivingly connected with the other of said diaphragm means, control means for selectively subjecting the other of said two chambers with the atmosphere and vacuum, said other diaphragm means being movable to urge said other means toward a position in said housing establishing pressure fluid communication between said ports in response to another differential force of the atmosphere in said one chamber and the vacuum in said other of said two chambers upon subjection thereto by said control means, an effective area on said control means subjected to the established fluid pressure at one of said ports, said control means being movable against said other diaphragm means toward a position in said housing isolating said one port from the other of said ports and partially relieving the established fluid pressure at said one port in response to the established fluid pressure at said one port in response to the established fluid pressure at said one port acting on said area when said other of said two chambers is selectively subjected to the atmosphere by said control means to eliminate said other differential force, and said one diaphragm means being movable in response to the force of said resilient means into driving engagement with said other diaphragm means to drive said other means toward its pressure fluid communication establishing position in the event of the loss of vacuum in said one of said two chambers to eliminate the first named differential force.

2. An antiskid device comprising a power housing having a pair of housing portions, means removably secured between said housing portions and connecting said housing portions against displacement, a first diaphragm movable in said power housing and having its peripheral portion sealably engaged between said housing portions, said first diaphragm having one side thereof defining with one of said housing portions a first chamber for connection with a source of vacuum, a second diaphragm movable in said power housing and having its peripheral portion sealably engaged between said housing portions, said second diaphragm having one side thereof defining with the other side of said first diaphragm a second chamber in said power housing, a hub portion on said one housing portion extending into said first chamber, a bore in said one housing portion extending through said hub portion, an aperture in said first diaphragm between said one and other sides thereof, piston means extending through said first chamber and having opposed end portions, one of said opposed end portions being slidable in said bore and the other of said opposed end portions extending through said aperture, radially extending flange means on said piston adjacent to said other end portion and sealably engaged with said other side of said first diaphragm about said aperture, a support plate on said piston means and sealably engaged with said other side of said first diaphragm about said aperture, a venting passage extending through said piston means and connecting said second chamber with the atmosphere, resilient means in said first chamber engaged between said support plate and said one housing portion, abutment means in said first chamber on said one housing portion for engagement with said support plate, the atmosphere in said second chamber acting on said other side of said first diaphragm and the vacuum in said first chamber acting on said one side of said first diaphragm to establish a differential force normally urging said first diaphragm against the force of said resilient means toward an inoperative position engaging said support plate with said abutment means, the other side of said second diaphragm defining with the other of said housing portions a third chamber for selective subjection to the atmosphere and to the atmosphere and to the source of vacuum, cylinder means connected with said other housing portion, a pair of ports in said cylinder means for respective connection with a master cylinder and a brake motor, other means movable in said cylinder means between one position establishing open pressure fluid communication between said ports and another position isolating said ports from each other and reducing the established fluid pressure at one of said ports connected with the brake motor, said other means including an abutment portion extending into said third chamber for driving engagement with said other side of said second diaphragm, the atmosphere in said second chamber acting on said one side of said second diaphragm and the vacuum in third chamber acting on said other side of said second diaphragm upon the selective subjection of said third chamber to the vacuum source to establish another differential force urging said second diaphragm toward driving engagement with said abutment portion and driving said other means toward its one position in said cylinder means, an effective area on said other means for subjection to the established fluid pressure at said one port, the established fluid pressure at said one port acting on said effective area to urge said other means toward its other position in said cylinder means and against said second diaphragm upon the selective subjection of said third chamber to the atmosphere to eliminate the other differential force, and said first diaphragm being movable in response to the force of said resilient means to drivingly engage said other opposed end portion of said piston means with said one side of said second diaphragm to thereafter concertedly urge said other means toward its one position in said cylinder means in the event of the loss of vacuum in said first chamber eliminating the first named differential force.

3. An antiskid device comprising a housing, means movable in said housing for controlling the application therethrough of supplied fluid pressure including other means for selective subjection to a control differential fluid pressure defined by vacuum and the atmosphere acting thereacross, said other means being responsive to the control differential fluid pressure when subjected thereto to urge said first named means toward a communicating position in said housing effecting the application therethrough of the supplied fluid pressure, control means for selectively subjecting said other means to vacuum including solenoid means actuated in response to a signal upon impending vehicle skid conditions to selectively subject said other means to the atmosphere and eliminate the control differential fluid pressure, said first named means being movable in response to the applied fluid pressure acting thereon toward a position isolating the supplied and applied fluid pressure upon actuation of said control means to selectively subject said other means to the atmosphere, and disabling means normally subjected to control differential fluid pressure and movable in said housing for driving engagement with said first named means, said disabling means being normally urged toward an inoperative position in said housing in response to control differential fluid pressure acting thereon and being movable in the event of the loss of control differential fluid pressure to engage and drive said first named means toward its communicating position.

4. An antiskid device according to claim 3, wherein said other means and said disabling means define with said housing three separate chambers, one of said chambers being between said other means and disabling means and intermediate the other two chambers and subjected at all times to the atmosphere, said disabling means being normally urged to its inoperative position in response to the control differential fluid pressure of atmosphere in said one chamber and vacuum in one of said other two chambers acting thereon and being movable in the event of the loss of vacuum in said one of said other two chambers to drive said first named means toward its communicating position, and means connecting said control means in communication with the other of said other two chambers, said other means being responsive to the control differential fluid pressure of atmosphere in said one chamber and vacuum in the other of said other two chambers acting thereon to urge said first named means to its communicating position, and said first named means being actuated to its isolating position in response to the applied fluid pressure acting thereon when said control means is actuated to selectively subject the other of said other two chambers to the atmosphere.

5. An antiskid device according to claim 4, wherein said other means and disabling means include a pair of diaphragm means in said housing between said one chamber and the one and other of said other two chambers, respectively.

6. An antiskid device according to claim 5, wherein said disabling means also includes at least one spring in the one of said other two chambers biased between one of said diaphragm means and said housing, said one diaphragm means being movable against the force of said spring toward its inoperative position in response to the atmosphere in said one chamber and vacuum in said one of said other chambers acting thereon, and said one diaphragm means being movable in response to the force of said spring to drive said first named means to its communicating position upon the loss of vacuum in the one of said other two chambers.

7. An antiskid device according to claim 5, comprising venting means extending through the one of said other two chambers and having opposed portions sealably engaged with one of said diaphragm means and said housing, respectively, and a venting passage in said venting means connecting said one chamber with the atmosphere.

8. An antiskid device according to claim 4, wherein said disabling means includes resiliently urged means movable in said housing between said one chamber and the one of said other two chambers, said resiliently urged means being urged against its own force toward its inoperative position in response to the atmosphere in said one chamber and vacuum in the one of said other two chambers acting thereon, and said resiliently urged means being movable in response to its own force to drive said first named means toward its communicating position in the event of the loss of vacuum in the one of said other two chambers.

9. An antiskid device according to claim 8, wherein said resiliently urged means includes diaphragm means movable in said housing between said one chamber and the one of said other two chambers, and resilient means in the one of said other two chambers urging said diaphragm means toward driving engagement with said first named means, said diaphragm means being movable toward the inoperative position in response to the atmosphere in said one chamber and the vacuum in the one of said two chambers acting thereon against the force of said resilient means and said diaphragm means being movable in response to the force of said resilient means to drive said first named means to its communicating position upon the loss of vacuum in the one of said other two chambers.

10. An antiskid device according to claim 4, comprising atmospheric, vacuum and delivery ports in said control means, said delivery port being connected with the other of said other two chambers and said connecting means connecting said vacuum port in communication with the one of said other two chambers, and valve means connected with said solenoid means and movable in said control means for controlling communication between said ports, said valve means being normally urged toward one position isolating said atmospheric port and connecting said vacuum and delivery ports in pressure fluid communication and said valve means being actuated by said solenoid means in response to its signal upon impending vehicle skid conditions toward another position isolating said vacuum port and connecting said atmospheric and delivery ports in pressure fluid communication.

11. An antiskid device according to claim 10, wherein the atmosphere and vacuum at said atmospheric and vacuum ports act in said valve means to establish a force urging said valve means toward its one position when said valve means is in its one position and said force being eliminated upon movement of said valve means to its other position, driving means in said control means for subjection to the vacuum at said vacuum port and the atmosphere and drivingly engaged with said valve means in its one position, the vacuum at said vacuum port and the atmosphere acting on said driving means to establish another force substantially equal and opposed to the first named force and urging said driving means into driving engagement with said valve means in its one position, and abutment means on said control means for engagement with said driving means, the other force urging said driving means into engagement with said abutment means upon the movement of said valve means toward its other position.

UNITED STATES PATENT OFFICE

CERTIFICATE OF CORRECTION

Patent No. 3,614,171              Issued October 19, 1971

John A. Machek

It is certified that error appears in the above-identified patent and that said Letters Patent are hereby corrected as shown below:

Column 4, line 61, after "47" insert a comma -- , --. Column 6, line 33, after "shown" insert a paranthesis -- ) --. Column 7, line 45, "moveable" should read -- movable --; line 66, including "in" delete down to and including -- port -- in line 67. Column 8, line 53, after "in" insert -- said --.

Signed and sealed this 6th day of March, 1973.

(SEAL)
Attest:

EDWARD M. FLETCHER, JR.
Attesting Officer

ROBERT GOTTSCHALK
Commissioner of Patents